US012467019B2

(12) United States Patent
Naqvi

(10) Patent No.: US 12,467,019 B2
(45) **Date of Patent: *Nov. 11, 2025**

(54) STABLE ANHYDROUS LAUNDRY DETERGENT CONCENTRATE AND METHOD OF MAKING SAME

(71) Applicant: ONE HOME BRANDS, INC., New York, NY (US)

(72) Inventor: Syed Humza Naqvi, Walnut Creek, CA (US)

(73) Assignee: One Home Brands, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/662,820

(22) Filed: May 13, 2024

(65) Prior Publication Data

US 2024/0294851 A1 Sep. 5, 2024

Related U.S. Application Data

(63) Continuation of application No. 17/838,150, filed on Jun. 10, 2022, now Pat. No. 12,006,491, which is a continuation of application No. 16/839,937, filed on Apr. 3, 2020, now Pat. No. 11,359,168.

(51) Int. Cl.

| | |
|---|---|
| ***C11D 3/386*** | (2006.01) |
| ***C11D 1/14*** | (2006.01) |
| ***C11D 1/83*** | (2006.01) |
| ***C11D 3/10*** | (2006.01) |
| ***C11D 3/12*** | (2006.01) |
| ***C11D 3/20*** | (2006.01) |
| ***C11D 3/22*** | (2006.01) |
| ***C11D 17/00*** | (2006.01) |
| *C11D 1/66* | (2006.01) |

(52) U.S. Cl.
CPC ............ *C11D 3/38609* (2013.01); *C11D 1/83* (2013.01); *C11D 3/10* (2013.01); *C11D 3/124* (2013.01); *C11D 3/2086* (2013.01); *C11D 3/222* (2013.01); *C11D 3/386* (2013.01); *C11D 3/38645* (2013.01); *C11D 17/006* (2013.01); *C11D 1/146* (2013.01); *C11D 1/662* (2013.01); *C11D 2111/12* (2024.01)

(58) Field of Classification Search
CPC ..... C11D 3/38609; C11D 3/2086; C11D 3/10; C11D 17/006; C11D 3/123
See application file for complete search history.

(56) References Cited

U.S. PATENT DOCUMENTS

| | | | | |
|---|---|---|---|---|
| 7,083,047 | B2 | 8/2006 | Bone et al. | |
| 10,577,565 | B2 | 3/2020 | Bartelme et al. | |
| 11,021,291 | B1 * | 6/2021 | Paiji | B65D 1/0261 |
| 11,401,488 | B2 * | 8/2022 | Naqvi | C11D 1/722 |
| 12,006,491 | B2 * | 6/2024 | Naqvi | C11D 3/10 |
| 2002/0082187 | A1 * | 6/2002 | Moore | A61K 33/22 510/447 |
| 2004/0065578 | A1 * | 4/2004 | Bone | C11D 17/042 525/61 |
| 2004/0077519 | A1 * | 4/2004 | Price | A61P 27/02 442/59 |
| 2009/0176682 | A1 | 7/2009 | Boutique et al. | |
| 2009/0217464 | A1 | 9/2009 | Souter et al. | |
| 2010/0120651 | A1 * | 5/2010 | Dale | C11D 3/38636 510/276 |
| 2014/0366281 | A1 * | 12/2014 | Mort, III | C11D 1/29 510/347 |
| 2016/0340302 | A1 * | 11/2016 | Arhancet | C11D 3/3719 |
| 2017/0002295 | A1 | 1/2017 | Arhancet et al. | |
| 2018/0094219 | A1 * | 4/2018 | Chieffi | C11D 3/2075 |
| 2018/0334640 | A1 * | 11/2018 | Bartelme | C11D 3/044 |
| 2018/0362901 | A1 | 12/2018 | Neto et al. | |
| 2020/0263114 | A1 * | 8/2020 | Naqvi | C11D 1/722 |
| 2020/0332234 | A1 * | 10/2020 | Naqvi | C11D 17/0073 |
| 2020/0377827 | A1 * | 12/2020 | Naqvi | C11D 3/222 |
| 2022/0372406 | A1 * | 11/2022 | Naqvi | C11D 3/08 |
| 2024/0294851 | A1 * | 9/2024 | Naqvi | C11D 3/222 |

FOREIGN PATENT DOCUMENTS

| | | | | |
|---|---|---|---|---|
| CN | 106190601 A | | 12/2016 | |
| CN | 107488531 A | | 12/2016 | |
| DE | 102019135562 A1 | | 6/2021 | |
| EP | 3301168 A1 | | 4/2018 | |
| EP | 3409754 A1 | | 12/2018 | |
| EP | 3546558 A1 | | 10/2019 | |
| GB | 2307695 A | | 6/1997 | |
| GB | 2315763 A | | 2/1998 | |
| GB | 2593781 A | * | 10/2021 | C11D 1/29 |
| WO | WO 2010-056671 A1 | | 5/2010 | |
| WO | WO-2019191170 A1 | * | 10/2019 | C11D 1/22 |

OTHER PUBLICATIONS

Chinese National IP Office, Office Action for Chinese Appln. No. 202080098191.3 dated Jan. 25, 2025, 15 pgs.

Jain Fen, Q., "Fabric Cleaning Technology." Donghua University Press, Jul. 31, 2011, pp. 83-84 with a cover page with an English Abstract of book.

MERCK: Subtilisin (https://www.sigmaaldrich.com/DE/search/subtilisin-a-focus=products&page=1&perpage=30&sort=relevant&term=subtilisin&20a&type=product_name retrieved on Jun. 2, 2024]—8 pages.

* cited by examiner

*Primary Examiner* — Mark Eashoo
*Assistant Examiner* — M. Reza Asdjodi
(74) *Attorney, Agent, or Firm* — Herbert Smith Freehills Kramer (US) LLP

(57) ABSTRACT

The invention relates to stable, anhydrous laundry detergent concentrated formulation in solid forms.

18 Claims, No Drawings

STABLE ANHYDROUS LAUNDRY DETERGENT CONCENTRATE AND METHOD OF MAKING SAME

CROSS-REFERENCE TO RELATED APPLICATIONS

This application is a continuation application of U.S. Non-provisional patent application Ser. No. 17/838,150, filed Jun. 10, 2022 and now U.S. Pat. No. 12,006,491, which is a continuation application of U.S. Non-provisional patent application Ser. No. 16/839,937, filed Apr. 3, 2020 and now U.S. Pat. No. 11,359,168, all of which are incorporated herein in their entirety.

BACKGROUND

The majority of laundry detergent products come in as vessel with a dispenser. They also can come in as bulk as refill. These vessels are mostly plastic, glass, carboard lined with plastic as water barrier. Majority of time these laundry detergent in the market are in thin liquid or gel forms. One of the problem is the packaging. Single use plastic is everywhere and it is wreaking havoc on the environment. Only 9% of all plastic is actually recycled, and packaging generates the largest portion of municipal waste (~30%). Packaged products are inefficient for businesses and the people who buy them.

Removing the water from laundry detergent formulations removes the need for single use plastic packaging and the waste that comes with it, such as packaging waste, product waste, and the waste of resources used to ship water.

Thus, a need exists for new stable formulations of laundry detergent concentrate that meet the needs of consumers, while also reducing the amount of waste generated in their production and shipping.

SUMMARY

The application relates to stable, anhydrous laundry detergent concentrate formulations. The stable anhydrous laundry detergent concentrate formulations may be in a solid form such as a tablet, granulars, powder, sachet, or polymer membrane (PVA, PVP, HPMC, etc) form.

In one aspect, a stable anhydrous laundry detergent concentrate formulation in a solid form is provided. The formulation comprise an acidic cleaner, a basic cleaner, a surfactant, and an enzyme, wherein the weight ratio of the enzyme to the surfactant is greater than 1:1, or wherein the formulation is polyvinyl alcohol, glycerol, or glycol free, or wherein the formulation is fatty acid free and/or animal fat free.

In some embodiments, the acidic cleanser is present in an amount of about 15-25 wt % based on the total weight of the formulation.

In some embodiments, the basic cleaner is present in an amount of about 40-50 wt % based on the total weight of the formulation.

In some embodiments, the surfactant is present in an amount of about 1-15 wt % based on the total weight of the formulation.

In some embodiments, the enzyme is present in an amount of about 9-25 wt % based on the total weight of the formulation.

In some embodiments, the acidic cleaner is selected from citric acid and malic acid.

In some embodiments, the acidic cleaner comprises citric acid

In some embodiment, the basic cleaner is selected from sodium carbonate, sodium bicarbonate and any other alkali carbonates and bicarbonates.

In some embodiments, the basic cleaner comprises sodium carbonate.

In some embodiments, the surfactant comprises an anionic surfactant.

In some embodiments, the surfactant comprises a non-ionic surfactant.

In some embodiments, the surfactant comprises an anionic and nonionic surfactant.

In some embodiments, the anionic surfactant is selected from sodium coco sulfate and sodium lauryl sulfate.

In some embodiments, the anionic surfactant comprises sodium coco sulfate.

In some embodiments, the non-ionic surfactant is selected from ethoxylated alcohol and alkyl polyglucosides.

In some embodiments, the non-ionic surfactant comprises alcohols C12-C14 ethoxylated and lauryl and/or myristyl glucoside.

In some embodiments, the enzyme comprises a protease.

In some embodiments, the enzyme comprises subtilisin, amylase, mannanase, and pectate lyase.

In some embodiments, the enzyme comprises subtilisin, amylase, mannanase, pectate lyase, and cellulase.

In some embodiments, the formulation further comprises a disintegrant.

In some embodiments, the disintegrant is present in an amount of about 1-10 wt % based on the total weight of the formulation.

In some embodiments, the disintegrant comprises sodium starch glycolate.

In some embodiments, the disintegrant comprises sodium starch glycolate and microcrystalline cellulose.

In some embodiments, the formulation further comprises a flow aid.

In some embodiments, the flow aid comprises hydrated silica.

In some embodiments, the formulation further comprises a filler.

In some embodiments, the filler comprise sodium silicate.

In some embodiments, the formulation has a pH of about 7.0-9.0 when dissolving in appropriate amount of water.

In some embodiments, the formulation is in the form of a tablet.

In some embodiments, the tablet weighs about 6.2-6.8 g per tablet.

In another aspect, a method of preparing a laundry detergent tablet is provided. The method comprises blending homogeneously the ingredients for the laundry detergent formulation disclosed herein to form a mixture and compressing the mixture to form the tablet.

DETAILED DESCRIPTION OF THE INVENTION

This disclosure relates to a stable, anhydrous laundry detergent concentrate formulation in a solid form. The inventors have discovered a solid formulation that is both good for the environment and effective for cleaning. The advantages of this anhydrous solid form over the traditional liquid cleansers include chemical stability, reduced packaging, and convenience for the consumer. The stable, anhydrous laundry detergent concentrate formulation can be in a tablet, granulars, powder, sachet, or polymer membrane (PVA, PVP, HPMC, etc) form.

As used in this specification, the singular forms "a," "an," and "the" include plural referents unless the context clearly dictates otherwise. Thus, for example, reference to a "preservative booster" includes a single kind of preservative booster or two or more different kinds of preservative booster.

"About" as used herein means within an acceptable error range for the particular value as determined by one of ordinary skill in the art, which will depend in part on how the value is measured or determined, (i.e., the limitations of the measurement system). For example, "about" can mean within 1 or more than 1 standard deviations, per practice in the art. Where particular values are described in the application and claims, unless otherwise stated, the term "about" means within an acceptable error range for the particular value. The term "about" when qualifying a value of a stated item, number, percentage, or term refers to a range of plus or minus ten percent of the value of the stated item, percentage, parameter, or term.

The term "anhydrous" as used herein refers to a stable, anhydrous laundry detergent concentrate formulation comprising less than about 10%, 9%, 8%, 7%, 6%, 5%, 4%, 3%, 2% or 1% by weight of water based on the weight of the concentrate formulation.

The term "substantially fatty acid-free" as used herein refers to a stable, anhydrous laundry detergent concentrate formulation comprising less than 10%, 9%, 8%, 7%, 6%, 5%, 4%, 3%, 2%, or 1% by weight of a fatty acid (or salt thereof) based on the weight of the concentrate formulation.

The term "polyvinyl alcohol free," "glycerol free," "glycol free," "fatty acid free," and "animal fat free" as used herein refers to a stable, anhydrous laundry detergent concentrate formulation comprising less than 10%, 9%, 8%, 7%, 6%, 5%, 4%, 3%, 2%, or 1% by weight of polyvinyl alcohol, glycerol, glycol, fatty acid (or salt thereof), and animal fat (such as tallow) (or salt thereof), respectively, based on the weight of the concentrate formulation.

The term "water softening agent" as used herein may be used interchangeably with chelating agent. For example citric acid and ethylenediaminetetraacetic acid (EDTA) are examples of water softening agent.

Some of the ingredients may have multiple functions. However, when two or more ingredients defined based on their functions are included in a formulation disclosed herein, the ingredients differ from each other in terms of their chemical structure. For example citric acid can be a water softening agent and an acidic cleaner as well, but when both water softening agent and acidic cleaner are used in the description of the formulation, they intend to refer to different ingredients in terms of the chemical structure.

The term "comprising" includes the embodiments of "consisting of" or "consisting essentially of."

The stable anhydrous laundry detergent concentrate formulation in a solid form can comprise an acidic cleaner, a basic cleaner, a surfactant, and an enzyme, wherein the weight ratio of the enzyme to the surfactant is greater than 1:1, or wherein the formulation is polyvinyl alcohol, glycerol, or glycol free, or wherein the formulation is fatty acid free and/or animal fat free.

In some embodiments, the stable anhydrous laundry detergent concentrate formulation may further comprise a disintegrant.

In some embodiments, the stable anhydrous laundry detergent concentrate formulation may further comprise a flow aid.

In some embodiments, the stable anhydrous laundry detergent concentrate formulation may further comprise a filler.

In each of the preceding aspect or embodiments, the laundry detergent concentrate tablet may further comprise a preservative and optionally a preservative booster.

In each of the preceding aspect or embodiments, the laundry detergent concentrate formulation may further comprise a dye/colorant and optionally a fragrance.

The amount of acidic cleaner in the formulation may range from about 15% to about 25% by weight based on the total weight of the formulation. The acidic cleaner may be citric acid and/or malic acid.

The amount of the basic cleaner in the formulation may range from about 40% to about 50% by weight based on the total weight of the formulation. The basic cleaner may be sodium carbonate, sodium bicarbonate and/or any other alkali carbonates.

The amount of surfactant in the formulation may range from about 1% to about 15% by weight based on the total weight of the formulation. The surfactant can be natural or synthetic surfactants, such an anionic, nonionic, amphoteric, zwitterioinic, or cationic surfactants, such as anionic and non-ionic surfactants, further such as a surfactant selected from sodium coco sulfate, ethoxylated alcohols (such as ethoxylated alcohol C(10-12)-C(14-16) with 4-8 moles ethoxylation, for example Clariant Genapol LA 060 (ethoxylated alcohol C12-C16) w/ 6 moles ethoxylation, ethoxylated alcohols C8-C10 6-8 moles of EO, etc.), sodium lauryl sulfate, and alkyl polyglucosides (such as lauryl glucoside, caprylyl/myristyl glucoside, caprylyl/decyl Glucoside).

The amount of enzyme in the formulation may range from about 9% to about 25% by weight based on the total weight of the formulation. The enzyme can include protease (e.g., subtilisin), amylase, mannanase, pectate lyase, and cellulase.

In some embodiments, the amount (e.g., weight) of enzyme is greater than the amount (e.g., weight) of surfactants present in the formulation. It would be desirable to have more enzymes than surfactants in the formulation because enzymes are biologically made and very easily biodegradable while surfactants take much longer tome to biodegrade. Enzymes also target each type of stain better than just with surfactant. By having high level enzymes, the overall dose size can be decreased.

The amount of the disintegrant in the formulation may range from about 1% to about 10% by weight based on the total weight of the formulation. The disintegrant can comprise sodium starch glycolate and/or microcrystalline cellulose. Other exemplary disintegrants include croscarmellose sodium, starch, pregelatinized starch, crospovidone, guar gum. The formulation disclosed herein comprising a disintegrant, e.g., sodium starch glycolate and/or microcrystalline cellulose, can dissolve more completely in cold water (40-60° F.) than a formulation that is otherwise identical but for containing no sodium starch glycolate and/or microcrystalline cellulose.

The amount of the flow aid in the formulation is less than 1% by weigh based on the total weight of the formulation. For example, it may range from about 0.1% to about 0.7% by weight based on the total weight of the formulation. The flow aid can include hydrated silica, medium chain triglycerides with two or three fatty acids having an aliphatic tail of 6-12 carbon atoms. Hydrated silica can also function as a dessicating agent.

The amount of the filler in the formulation may range from about 2% to 6% by weight based on the total weight of the formulation. Exemplary filler can be selected from dextrose, dextrin, starch, inulin, and sodium silicate.

The pH of the formulation dissolved in appropriate amount of water may range from about 7.0 to about 9.0.

The formulation may further comprise fragrance, which may be natural fragrances (e.g., essential oils) and/or synthetic fragrances and perfumes in the form of oils, crystals, powders, granules, and encapsulations. The fragrance can be selected from fragrance clean basil.

The formulation may further comprise dye or coloring agent, which can be any of the Food, Drug and Cosmetic (FD&C) approved dyes and colorants.

The stable anhydrous laundry detergent formulation can be in the form of a tablet. For example, the tablet can be in any size such that one tablet is sufficient to clean clothes per load. In some embodiments, the tablet is in the range of about 6.2-6.8 g/tablet.

To avoid effervescence from happening during storage when the formulation contain both an acidic and basic cleaner, the tablet can have a sufficient hardness and/or the tablet contains a desiccating agent such as hydrated silica or any other agent known to absorb moisture.

Methods for Preparing Stable Anhydrous Laundry Detergent Tablets

The stable anhydrous laundry detergent tablets can be prepared using any suitable method. Stable anhydrous laundry detergent tablet can be prepared using direct compression or wet granulation process. For this application direct compression is most preferred. The term direct compression (or direct compaction) is used to define the process by which tablets are compressed directly from powdered mixture of ingredients into a firm compact without employing the process of wet granulation. Powder is blended homogeneously by using a blender (Ribbon Blender, V-blender, paddle blender, drum mixing). The powder blender is then charged into the hopper of tablet press. Desire weight, compression ton, & hardness of tablet are set as the tablets get compressed and come out of the tablet press.

Methods of Using Stable Anhydrous Laundry Detergent Tablets

In one aspect, the invention includes a method of using any of the tablets described herein including the steps of (1) placing the tablet in a container of a washing machine wherein the container is reserved for detergent and (2) turning on the power for the washing machine.

The laundry detergent tablets may be stored in any suitable container, such as but not limited to plastic, glass, aluminum, ceramic, or acrylic container. The container may contain a desiccant. The container may be re-usable and refilled with new tablets as needed.

EXEMPLIFICATION

Example 1

A laundry detergent tablet was produced, using the following ingredients:

TABLE 1

| Ingredients | Weight (%) |
|---|---|
| Sodium Carbonate Dense | 40-50 |
| Citric Acid | 15-25 |
| Protease | 6-12 |
| Alcohols C12-C14 Ethoxylated | 3-9 |
| Sodium Silicate | 2-6 |
| Microcrystalline Cellulose | 1-5 |
| Sodium Starch Glycolate | 1-5 |
| Amylase | 1-5 |
| Mannanase | 1-3 |
| Pectate Lyase | 1-3 |
| Lauryl/Myristyl Glucoside | 1-3 |
| Hydrated Silica | <1 |
| Cellulase | 0.2-0.6 |
| pH | 7.0-9.0 |
| Tablet size | 6.2-6.8 g |

The pH of one tablet when dissolving in appropriate amount of water is 7.0-9.0. The tablet weighs 6.2-6.8 g/tablet.

The cleaning performance of the laundry detergent formulation described herein are tested under cold water condition using industry recognized protocols (e.g., standard guide for evaluation stain removal performance in home laundering, standard practice for obtaining spectrometric data for object-color evaluation, and guidelines for anti-redeposition properties of laundry products), washing pre-stained stains and taking a reading before and after with spectrophotometer. The cleaning efficiency of the laundry detergent formulation described herein are satisfactory and comparable to other competitors in the market in terms of stain removal, color retaining, and/or soil redeposition.

What is claimed is:

1. A stable anhydrous laundry detergent concentrate formulation in a solid form, comprising an acidic cleaner, a basic cleaner, a surfactant, and an enzyme, wherein the acidic cleaner is citric acid, wherein the acidic cleaner is present in an amount of about 15-25 wt % based on the total weight of the stable anhydrous laundry detergent concentrate formulation, wherein the basic cleaner is present in an amount of about 40-50 wt % based on the total weight of the stable anhydrous laundry detergent concentrate formulation;

wherein the surfactant is present in an amount of about 1-15 wt % based on the total weight of the stable anhydrous laundry detergent concentrate formulation;

wherein the enzyme is present in an amount of about 9-25 wt % based on the total weight of the stable anhydrous laundry detergent concentrate formulation;

wherein the weight ratio of the enzyme to the surfactant is greater than 1:1, wherein the stable anhydrous laundry detergent concentrate formulation is polyvinyl alcohol free, wherein the stable anhydrous laundry detergent concentrate formulation comprises less than 1% by weight of water based on the total weight of the stable anhydrous laundry detergent concentrate formulation.

2. The stable anhydrous laundry detergent concentrate formulation of claim 1, wherein the basic cleaner is selected from sodium carbonate, sodium bicarbonate and any other alkali carbonates and bicarbonates.

3. The stable anhydrous laundry detergent concentrate formulation of claim 1, wherein the surfactant comprises an anionic surfactant and/or a nonionic surfactant.

4. The stable anhydrous laundry detergent concentrate formulation of claim 3, wherein the anionic surfactant is selected from sodium coco sulfate and sodium lauryl sulfate, wherein the nonionic surfactant is selected from ethoxylated alcohol and alkyl polyglucosides.

5. The stable anhydrous laundry detergent concentrate formulation of claim 3, wherein the nonionic surfactant comprises alcohols C12-C14 ethoxylated, lauryl glucoside, and/or myristyl glucoside.

6. The stable anhydrous laundry detergent concentrate formulation of claim 1, wherein the enzyme comprises a protease.

7. The stable anhydrous laundry detergent concentrate formulation of claim 1, wherein the enzyme comprises subtilisin, amylase, mannanase, pectate lyase, and/or cellulase.

8. The stable anhydrous laundry detergent concentrate formulation of claim 1, wherein the stable anhydrous laundry detergent concentrate formulation further comprises a disintegrant, wherein the disintegrant is present in an amount of about 1-10 wt % based on the total weight of the stable anhydrous laundry detergent concentrate formulation.

9. The stable anhydrous laundry detergent concentrate formulation of claim 8, wherein the disintegrant comprises sodium starch glycolate.

10. The stable anhydrous laundry detergent concentrate formulation of claim 8, wherein the disintegrant comprises microcrystalline cellulose.

11. The stable anhydrous laundry detergent concentrate formulation of claim 1, wherein the stable anhydrous laundry detergent concentrate formulation further comprises a flow aid, wherein the flow aid comprises hydrated silica.

12. The stable anhydrous laundry detergent concentrate formulation of claim 1, wherein the stable anhydrous laundry detergent concentrate formulation further comprises a filler, wherein the filler comprises sodium silicate.

13. The stable anhydrous laundry detergent concentrate formulation of claim 1, wherein the stable anhydrous laundry detergent concentrate formulation has a pH of about 7.0-9.0 when dissolved in an appropriate amount of water.

14. The stable anhydrous laundry detergent concentrate formulation of claim 1, wherein the stable anhydrous laundry detergent concentrate formulation is in the solid form of a tablet.

15. A stable anhydrous laundry detergent concentrate formulation in a solid form, comprising an acidic cleaner, a basic cleaner, a surfactant, and an enzyme, wherein the surfactant comprises lauryl glucoside and/or myristyl glucoside, wherein the acidic cleaner is present in an amount of about 15-25 wt % based on the total weight of the stable anhydrous laundry detergent concentrate formulation, wherein the basic cleaner is present in an amount of about 40-50 wt % based on the total weight of the stable anhydrous laundry detergent concentrate formulation;

wherein the surfactant is present in an amount of about 1-15 wt % based on the total weight of the stable anhydrous laundry detergent concentrate formulation;

wherein the enzyme is present in an amount of about 9-25 wt % based on the total weight of the stable anhydrous laundry detergent concentrate formulation;

wherein the weight ratio of the enzyme to the surfactant is greater than 1:1, wherein the stable anhydrous laundry detergent concentrate formulation is polyvinyl alcohol free, wherein the stable anhydrous laundry detergent concentrate formulation comprises less than 1% by weight of water based on the total weight of the stable anhydrous laundry detergent concentrate formulation.

16. The stable anhydrous laundry detergent concentrate formulation of claim 15, wherein the enzyme comprises subtilisin, amylase, mannanase, and cellulase.

17. The stable anhydrous laundry detergent concentrate formulation of claim 16, wherein the stable anhydrous laundry detergent concentrate formulation further comprises a disintegrant, wherein the disintegrant comprises microcrystalline cellulose.

18. The stable anhydrous laundry detergent concentrate formulation of claim 16, wherein the stable anhydrous laundry detergent concentrate formulation further comprises a flow aid, wherein the flow aid comprises hydrated silica.

* * * * *